Sept. 30, 1930.     C. E. CARPENTER     1,776,780
DOUGH BATCH FEEDER AND THE LIKE
Filed July 13, 1929     2 Sheets-Sheet 1
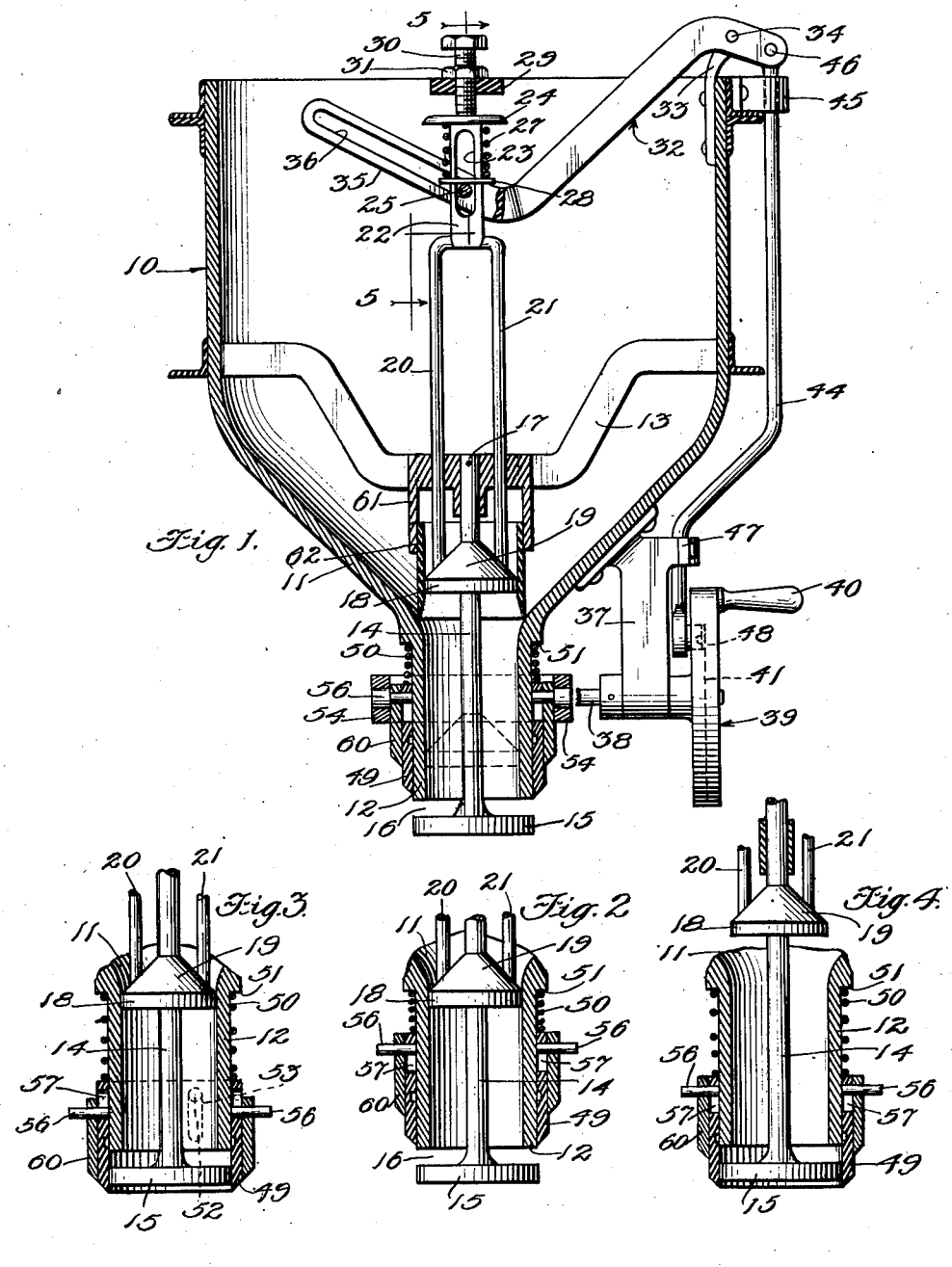

Sept. 30, 1930.  C. E. CARPENTER  1,776,780
DOUGH BATCH FEEDER AND THE LIKE
Filed July 13, 1929  2 Sheets-Sheet 2
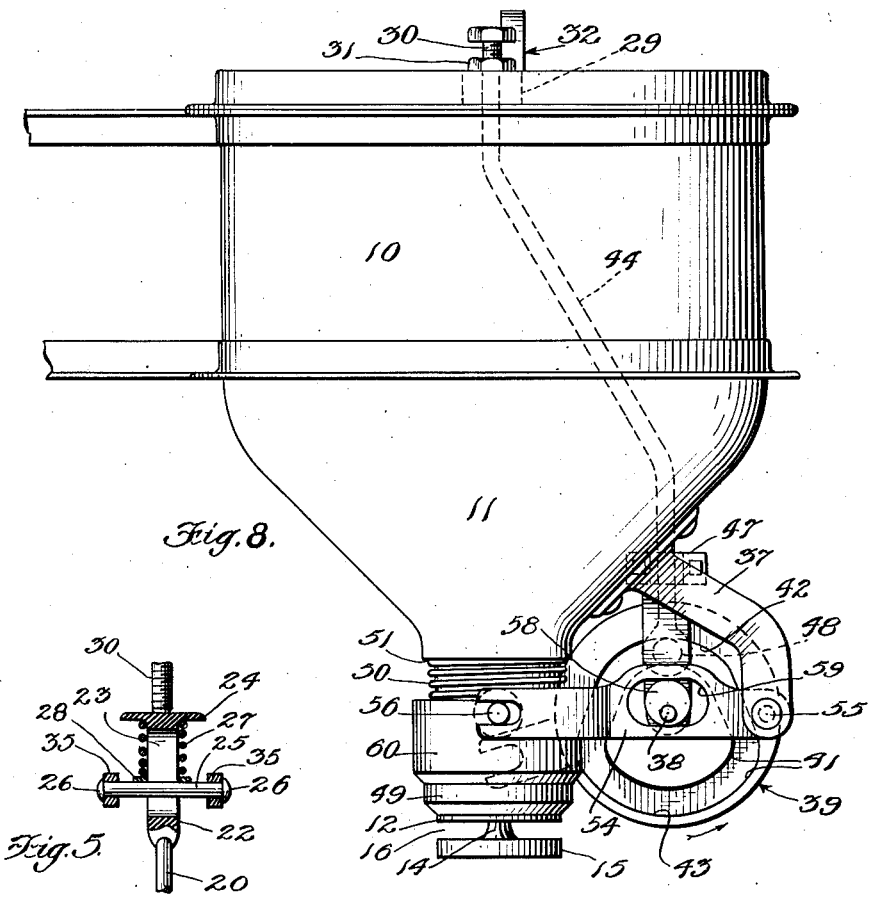
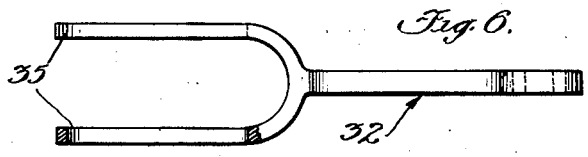
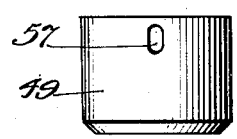
Inventor:
Charles E. Carpenter
By Thos. O. Danwigh
Atty.

Patented Sept. 30, 1930

1,776,780

UNITED STATES PATENT OFFICE

CHARLES E. CARPENTER, OF CHICAGO, ILLINOIS

DOUGH-BATCH FEEDER AND THE LIKE

Application filed July 13, 1929. Serial No. 377,959.

This invention has to do with improvements in dough batch feeders and the like. In particular it relates to improvements in the construction of dough batch feeders for forming and delivering doughnuts.

One object of the invention is to provide a very simple form of construction and one in which the number of moving parts operating within or through the body of the dough is reduced to a minimum. In this connection it is a further feature to provide a construction such that the batches of dough will be very definitely drawn into place beneath the plunger and will be very positively and uniformly delivered from the delivery opening by the working strokes of the plunger.

A further object in connection with the foregoing is to make provision for definitely closing and sealing the delivery opening from the throat during the suction or inlet movement of the plunger. This will cause the creation of a partial vacuum in the delivery throat so that thereafter when the plunger reaches the proper position to admit dough into the throat, the dough will be forcibly and positively moved into the throat by the vacuum or suction so created.

A further feature of the invention relates to the provision of an improved stroke regulating or adjusting mechanism for regulating the operating stroke of the plunger. Such regulation is for the purpose of varying the amount of dough which will be taken into the place beneath the plunger during each movement of the latter. In this connection I may state that the delivery movement of the plunger should always be performed down to a certain definite and established position in the throat in order to properly deliver the batch of dough. The variation of plunger stroke should be performed at the upper or inlet end of the movement, the plunger being raised to an upper limit of movement depending upon the amount of dough intended to be delivered into the batch.

One object of the invention is to provide operating mechanism for reciprocating the dough feeding plunger, the arrangement being such that the plunger always moves down to a given delivery position, and being such that the upper limit of plunger movement may be adjusted as desired according to the size of the dough batch to be delivered. A further feature in this connection is to provide an extremely simple construction of device and one whereby the size of the dough batch can be readily adjusted merely by adjustment of the setting of a set-screw.

A further feature in connection with the foregoing is to provide a construction such that the swings or reciprocations of the operating arm and associated mechanism do not need to be varied, but may be always operated through the same definitely established amount of travel.

A further feature of the invention relates to the provision of an improved construction of delivery device, the improvement being such that the batch of dough is always easily and completely released from the machine without any tendency to tear or distort the formed ring of dough.

Other objects are to provide a very simple form of machine and one which can be readily manufactured from few parts and at low costs.

Other objects and uses of the invention will appear from a detailed description of the same which consists in the features of construction and combinations of parts hereinafter described and claimed.

In the drawings:

Figure 1 shows a vertical section through a construction of device embodying the features of the present invention, the plunger being at the upper limit of its movement as determined by the position of the set-screw and both of the throat sleeves being at the upper limit of their movement;

Figure 2 shows a fragmentary vertical section through the throat and the throat sleeves, together with the plunger, the plunger being at the lower limit of its movement for expelling the dough batch and the throat sleeves being in their fully raised position;

Figure 3 shows a view similar to that of Figure 2, with the exception that the throat sleeves have been moved down into position to seal off the lower end of the throat;

Figure 4 shows a view similar to that of

Figure 3 with the exception that the plunger has been raised while keeping the throat sleeves in their lowered position, such raising movement resulting first in the creation of a partial vacuum within the throat and afterwards in the opening of the upper end of the throat to allow the fresh batch of dough to enter the same;

Figure 4 shows an outside view of the machine taken at right angles to the direction of Figure 1;

Figure 5 shows a fragmentary detail section on the line 5—5 of Figure 1, looking in the direction of the arrows.

Figure 6 shows a fragmentary plan view of the operating lever and fork;

Figure 7 shows a fragmentary detail side view of the inside throat sleeve; and

Figure 8 shows a fragmentary detail vertical sectional view of a throat and plunger construction of modified form.

The hopper is designated by the numeral 10. In its lower portion 11 it is drawn inwardly on an angle of substantially 45° and its extreme lower end is provided with a downwardly depending throat 12. Any suitable cover may be provided for the hopper but in the construction illustrated no cover is shown.

Extending across the central portion of the hopper there is a bracket bar 13. A rod 14 reaches from said bracket bar down through the central portion of the throat and terminates in a disk 15 located such a distance below the lower end of the throat as to establish an annular delivery opening or orifice 16. The disk 15 is of proper diameter to establish the desired size of perforation in the doughnut; and preferably the disk 15 is of the same size as the external size of the throat 12. Such being the case the throat sleeves presently to be described are enabled to slide down around the outside of the throat and directly engage the periphery of the disk 15.

The rod 14 is preferably removably connected to the bracket bar 13 as by means of the removable pin 17, so that upon removing said pin the rod 14 and disk 15 can be dropped straight down and removed at the lower end of the throat.

There is a plunger 18 slidably mounted upon the rod 14. Said plunger is a proper size to work into the inside of the throat 12 in sealing fashion. Preferably the top surface 19 of the plunger is conical in form so that when the plunger is raised up into the batch of dough it will create a minimum amount of disturbance therein. The plunger 18 is provided with a pair of upperwardly extending operating rods 20 and 21 which reach up through the bracket 13 and have their upper ends connected to a stem 22. Said stem is provided with a vertical slot 23. Also at its upper end the stem 22 carries a disk 24.

There is a cross pin 25 reaching through the slot 3 and having its outer ends enlarged as shown at 26 in Figure 4. A spring 27 is located between a disk 28 surrounding the stem 22 and bearing against the pin 25, and the head 24. The result is that said spring tends to raise the stem 22 with respect to the pin 25 until the said pin engages the lower end of the slot 23. Under this condition, if the pin 25 is raised the stem 22 is also raised, thereby raising the plunger 18; but as soon as the stem 22 is arrested in its upward movement the plunger 18 is also arrested, and further upward movement of the pin 25 simply results in compressing the spring 27.

There is a cross bar 29 reaching across the upper end of the hopper 10. A stud or set-screw 30 is threaded down through the cross bar 29 and stands in line with the disk 24 on the upper end of the stem 22, so that said stud 30 limits the upward movement of the stem. If desired a lock nut 31 may be provided on the screw 30 for securing it in position.

There is a lever arm 32 pivoted near one end to a bracket 33 which bracket is secured to the upper end of the hopper 10. Such pivotal mounting is provided by means of a movable pin 34. The lower end of said arm 32 is forked or bifurcated as shown at 35 in Figure 6; and the arms of the forked part are slotted as shown at 36 in Figure 1. The end portions of the pin 25 work in said slots 36. Consequently the downward swinging of the arm 32 occasioned by raising its outer end will cause the plunger to be forced down. Likewise, the up-swing of said arm 32 will cause the plunger to be raised until its movement is arrested by the position of the screw 30, and any further upward movement of the arm 32 will simply result in compressing the spring 27.

There is a bracket 37 reaching downwardly from the tapered portion 11 of the hopper. A stub shaft 38 is journaled in said bracket. On its outer end said stub shaft carries a disk 39 having an operating handle or crank 40 by means of which it may be rotated.

On its back side the disk 39 is provided with a double faced cam slot 41 (see Fig. 4). This cam slot has upper and lower dwells 42 and 43 of different radii, the dwell 42 being of the shorter radius. There is a pitman 44 located along the side of the hopper. The upper end thereof works freely within a bracket 45 and said upper end is connected to the outer end of the lever arm 32 by means of a removable pin 46. The lower portion of the pitman is guided by a bearing 47 in the bracket 37, and the extreme lower end of the pitman has a stud 48 which reaches into the cam slot 41 and is worked thereby. The result is that the rotations of the disk 39 cause the arm 32 to be swung up and down with a pause or dwell at each limit of movement. The plunger 18 of course is moved accordingly.

There is an inner throat sleeve 49, slidably mounted on the outside of the throat 12. Due to the fact that the diameter of the disk 15 is the same as the outside size of the throat 12 this sleeve 49 is able to work down and embrace the disk 15 in sealing fashion as shown in Figures 3 and 4. When so lowered it is closed and seals the annular opening 16 already referred to and thus closes the throat 12 in airtight fashion.

There is a spring 50 located between the upper end of the sleeve 49 and a suitable shoulder 51 at the upper end of the throat, said spring normally tending to lower the sleeve 49 to its full extent. Such lowering movement is arrested, when not otherwise, by engagement of a stud 52 which reaches out from the throat and engages a vertical recess 53 on the inside face of the throat 49. The throat can not move any lower than limited by engagement of this slot with the stud 52.

There is a forked arm 54, the bifurcations of which embrace the sleeve 49 as evident from the different figures. The other end of said arm 54 is pivoted to the bracket 37 at the point 55. The bifurcations of the arm 54 control the sleeve 49 through the medium of pins 56. Said pins are raised and lowered with the swings of the bifurcated arm 54. The inner ends of said pins engage vertical slots 57 in the sleeve 49 so that when the arm 54 is raised said pins raise the sleeve 49 by engagement with the upper ends of the slots 57. As the bifurcated arm 54 descends the sleeve 49 is allowed to move down under the impulse of the spring 50, until further movement is arrested by the pin 52 engaging the upper end of the slot 53. Further downward movement of the arm 54 simply allows the pins 56 to move down through the slots 57 as shown in Figure 3. The swinging of the arm 54 is caused by means of an eccentric disk 58 mounted on the stub shaft 38. Said eccentric disk engages a slotted opening 59 of the arm 54 so as to properly swing the arm as the disk 39 is rotated.

The construction thus far described will operate to seal and unseal the annular opening 16 in proper harmony with respect to the movements of the plunger 18. The lower edge of the sleeve 49 is sharpened as clearly shown in Figures 2, 3, and 4 so that the ring of dough will readily disengage itself from the sleeve 49 and drop off without tearing or distorting the shape thereof. In order to accentuate this disengagement action, it will sometimes be found desirable to provide a second sleeve 60 working on the outside of the sleeve 49 and having its lower edge also sharpened. Such second sleeve 60 when provided is directly engaged by the pins 56 which reach through it as shown in Figures 2, 3, and 4, so that the sleeve 60 rises and falls exactly in harmony with the swings of the lever 54. Due to this fact, at the lower extreme limit of movement of the lever 54 the sleeve 60 is moved clear down with respect to the sleeve 49 (the sleeve 49 being arrested by the engagement of the pin 52 with the upper end of the slot 53). At such time the lower edges of the sleeves 60 and 49 come into registry as shown in Figure 3, and said lower edges are preferably bevelled on companion slopes so that they constitute in effect a continuous edge.

It will be understood that the timing of the movements of the link 44 and the lever 54 are such that the plunger 18 moves down into the throat 12 while the annular opening 16 is open as in Figure 2; that thereafter the sleeve 49 (and also the sleeve 60 if provided) move down to close the opening 16 and also cut off the ring of dough previously fed; that thereafter the plunger 18 is raised as in Figure 4, while the sleeve 49 remains in the lowered position so as to create a suction within the throat which will cause an inrush of dough when the plunger 18 rises above the throat; and that thereafter the sleeve 49 is raised back to the position of Figure 1, so as to uncover the opening 16 preparatory to another doughnut batch delivery.

In some instances it will be found desirable to provide a cylindrical sleeve within which the plunger 18 reciprocates in order to improve the suction action. For this purpose I have illustrated a sleeve 61 secured to the cross bracket 13 and reaching down towards the floor of the hopper, the upper end of said sleeve 61 being closed so that said sleeve constitutes in effect a cylinder which is closed at its upper end. This sleeve 61 when provided is somewhat larger in diameter than the throat 12 itself.

There is another sleeve 62 having its upper portion working within the sleeve 61 and its lower portion working up and down with respect to the floor of the hopper adjacent to the entrance to the throat 12. The internal diameter of the sleeve 62 is the same as that of the throat. The plunger 18 rides within the sleeve 62 with a certain amount of friction which is less than the friction of the sleeve 62 on the cylinder wall 61. Also the sleeve 62 is of such length that it can move up and down without disengagement from the cylinder wall 61. In its raised position its end lower rises a sufficient distance above the throat 12 to establish a full amount of opening for entrance of dough into said throat, while in its fully lowered position the sleeve 62 engages the upper end of the throat and seals against the same but without disengagement from the cylinder wall 61.

The operation of this device is as follows:

At the commencement of the down stroke of the plunger 18, the sleeve 62 is carried down with said plunger 18 due to the friction existing between these parts. In a short time the lower end of the sleeve 62 seals against the upper end of the throat. When this takes place the further downward movement of the plunger causes an effective delivery of the dough down into and through the throat; and due to the registry of the sleeve 61 with the throat the plunger is able to travel on down into the throat. When the up movement of the plunger 18 takes place the sleeve 62 will be entered and engaged by the plunger and the friction between these parts will compel the sleeve to raise with the plunger until the upper end of the sleeve strikes the upper end of the cylinder established by the wall 61. The continued upward movement of the plunger will operate to suck an additional amount of dough into place ready for the next delivery operation.

It will be understood that the cross bracket 13 and also the cross bar 29 may be readily made removable so that all of the operating parts can be easily removed from the interior of the hopper for the purpose of cleaning the same or renewing parts.

While I have herein shown and described only certain embodiments of the features of my present invention, still I do not intend to limit myself thereto except as I may do so in the claims.

In the particular construction illustrated in the drawings, the throat 12 constitutes a direct continuation from the hopper 10. As far as certain features of the present invention are concerned, they might be used with equal advantage in connection with other constructions in which the throat 12 is located at one side of the hopper instead of directly beneath the same.

I claim:

1. A dough batch feeding device comprising in combination a hopper having a downwardly depending delivery circular throat, a transverse bracket within the hopper, a downwardly depending pin reaching axially through the throat, a removable connection between the upper end of the said pin and the bracket, a horizontal disk on the lower end of said pin located below the lower delivery end of the throat and establishing an annular dough delivery orifice at the lower end of the throat, said disk having the same size as the exterior of the throat, a plunger mounted for reciprocation on the upper portion of said pin, said plunger being of the same diameter as the interior of the throat, a valve sleeve slidably mounted on the exterior of the throat and adapted to slide downwardly around and engage the outer edge of the disk, a drive crank rotatably mounted upon the exterior of the hopper, and operative connections therefrom to the plunger and to the valve sleeve, operative effectively to move the plunger downwardly into the throat with the valve sleeve in raised position to uncover the annular delivery opening aforesaid, and to thereafter raise said plunger out of the upper end of the throat and into the hopper with the valve sleeve in lowered and closed position, substantially as described.

2. A dough batch feeding device comprising in combination a dough hopper having a downwardly depending delivery throat, a stationary pin extending axially downward through the throat from a position within the hopper to a position below the throat, a disk secured to the lower end of said pin and beneath the lower end of the throat to establish an annular delivery orifice at the lower end of the throat, said disk being of the same size as the exterior of the throat, a plunger slidably mounted on the upper end of the pin and reciprocating between the lower portion of the hopper and the interior of the throat, a valve sleeve slidably mounted on the exterior of the throat and adapted to ride downwardly around the disk in sealing fashion to thereby close the annular discharge orifice, together with means operative effectively to move the plunger downwardly from a position within the hopper to a position within the throat and with the valve sleeve in raised position, and to thereafter raise the plunger from its position in the throat to its position within the hopper with the valve sleeve lowered and sealing the annular orifice between the lower end of the throat and the disk, substantially as described.

3. In a machine of the class described, the combination of a dough hopper, a delivery throat in conjunction therewith, a stationary disk located adjacent to the delivery end of said throat and separated therefrom to establish an annular discharge orifice, a valve sleeve slidably mounted on the exterior of the throat and reciprocating back and forth with respect to the disk to seal and unseal the discharge orifice, a plunger reciprocatingly mounted within the throat and working to a position above the throat and within the lower portion of the hopper, means for reciprocating said plunger to carry the same to a definite lower limit of movement at each stroke, and adjustable means for limiting the upper limit of plunger movement to thereby adjust the movement of the plunger within the hopper and above the upper end of the throat, substantially as described.

4. In a machine of the class described, the combination of a dough hopper, a delivery throat in conjunction therewith, means for intermittently opening and closing the lower end of said delivery throat, a plunger reciprocatingly mounted within the throat and working to a position above the throat and into the lower portion of the hopper, means for reciprocating the plunger to always move the same to a given lower limit of movement in the throat, and adjustable means for varying the upper limit of movement of the plunger to thereby adjust the clearance of said plunger above the throat and in the hopper, substantially as described.

5. In a dough batch machine the combination of a hopper, a delivery throat in conjunction therewith, and means for delivering into the said throat batches of dough of regulated size, said means comprising a plunger reciprocating in the throat to a position above the throat and within the hopper, together with means for varying the upper limit of plunger movement to thereby vary the movement of the plunger into the hopper above the upper end of the throat, substantially as described.

6. In a dough batch machine, the combination of a hopper, a delivery throat in conjunction therewith, a plunger reciprocating within the throat and into the lower portion of the hopper, plunger operating means reciprocating through a given definite amount of reciprocation, and a connection between said operating means and the plunger operative effectively to move the plunger always to the same lower limit of movement and to raise the plunger under spring pressure, together with means for limiting the amount of such raising action to thereby adjust the rising movement of the plunger, substantially as described.

7. In a dough batch feeding machine, the combination of a hopper, a delivery throat in conjunction therewith, a plunger reciprocating in the throat and into the lower portion of the hopper, plunger operating means, a positive connection therefrom to the plunger for effecting downward movements of the plunger to a fixed lower limit of movement and a spring yielding connection between the plunger operating means and the plunger operative effectively to permit yielding action on the up-stroke of the plunger to thereby permit variation of the upper limit of plunger movement, substantially as described.

8. In a machine of the class described, the combination of a hopper, a delivery throat in conjunction therewith, a plunger reciprocating in said throat and into the lower portion of the hopper, and means for reciprocating said plunger with a variable amount of stroke between a fixed limit of movement in one direction and a variable limit of movement in the other direction, substantially as described.

CHARLES E. CARPENTER.